(12) United States Patent
Emmons et al.

(10) Patent No.: US 8,596,917 B2
(45) Date of Patent: *Dec. 3, 2013

(54) SYSTEM FOR REPAIRING AND STRENGTHENING PIPE WITH INTERNAL HELICALLY WOUND TENSILE REINFORCEMENT

(75) Inventors: Peter H. Emmons, Finksburg, MD (US); John R. Crigler, Woodbine, MD (US); Michael R. Moussa, Euless, TX (US); Dan A. Dock, Irving, TX (US); Scott V. Bauer, Sachse, TX (US); Nathan D. Sauer, Baltimore, MD (US)

(73) Assignee: Structural Group, Inc., Hanover, MD (US)

( * ) Notice: Subject to any disclaimer, the term of this patent is extended or adjusted under 35 U.S.C. 154(b) by 240 days.

This patent is subject to a terminal disclaimer.

(21) Appl. No.: 13/107,311

(22) Filed: May 13, 2011

(65) Prior Publication Data

US 2011/0280665 A1 Nov. 17, 2011

Related U.S. Application Data

(60) Provisional application No. 61/395,392, filed on May 13, 2010.

(51) Int. Cl.
*F16L 55/18* (2006.01)

(52) U.S. Cl.
USPC .................. 405/184.1; 405/183.5; 405/184.2; 138/129

(58) Field of Classification Search
CPC ........................................................ B29C 63/32
USPC ................. 405/183.5, 184.1, 184.2; 138/129; 254/134.5

See application file for complete search history.

(56) References Cited

U.S. PATENT DOCUMENTS

| | | |
|---|---|---|
| 2,917,820 A | 12/1959 | Matheny |
| 3,149,646 A | 9/1964 | Xenis |
| 3,401,442 A | 9/1968 | Matheny |
| 4,456,401 A | 6/1984 | Williams |
| 4,640,313 A | 2/1987 | Stanley |
| 4,768,562 A | 9/1988 | Strand |
| 4,773,450 A | 9/1988 | Stanley |
| 4,776,370 A | 10/1988 | Long, Jr. |

(Continued)

FOREIGN PATENT DOCUMENTS

| | | |
|---|---|---|
| GB | 1352829 | 5/1974 |
| GB | 2107765 | 5/1983 |
| WO | WO00/40888 | 7/2000 |
| WO | WO02/090227 | 11/2002 |

*Primary Examiner* — Benjamin Fiorello
(74) *Attorney, Agent, or Firm* — Whiteford, Taylor & Preston, LLP (57) ABSTRACT

A method for repairing and strengthening pipes by creating a structural reinforced composite liner within the existing pipe. The liner is created by helically winding a tensile reinforcement material on the inside wall of a pipe and encapsulating it in a hardening matrix material. The reinforcement material is helically wound around the inside wall of the pipe by an installation device. The installation device is configured to relieve and/or prevent the development of torsional stress in the reinforcement material that is created by the act of helically winding it onto the inside wall of a pipe, allowing the reinforcement material to lay flat against the pipe wall without twisting or buckling. The structural reinforced composite can be configured to supplement the strength of the existing pipe or to function as a stand-alone pipe within the existing pipe.

19 Claims, 9 Drawing Sheets

(56) References Cited

U.S. PATENT DOCUMENTS

| | | | |
|---|---|---|---|
| 4,955,755 | A | 9/1990 | Frey |
| 4,995,929 | A | 2/1991 | Menzel |
| 5,044,405 | A | 9/1991 | Driver et al. |
| 5,101,863 | A | 4/1992 | Fujii et al. |
| 5,308,430 | A | 5/1994 | Saito et al. |
| 5,372,162 | A | 12/1994 | Frey |
| 5,683,530 | A | 11/1997 | Fawley et al. |
| 5,931,198 | A | 8/1999 | Raji et al. |
| 6,089,275 | A | 7/2000 | Steketee et al. |
| 6,167,913 | B1 | 1/2001 | Wood et al. |
| 6,283,211 | B1 | 9/2001 | Vloedman |
| 6,619,886 | B1 | 9/2003 | Harrington |
| 6,637,092 | B1 * | 10/2003 | Menzel et al. ............ 29/451 |
| 6,679,334 | B2 | 1/2004 | Johnson et al. |
| 6,703,091 | B1 | 3/2004 | Walker |
| 6,857,452 | B2 | 2/2005 | Quigley et al. |
| 7,004,202 | B2 | 2/2006 | Bateman et al. |
| 7,025,580 | B2 | 4/2006 | Heagy et al. |
| 7,258,141 | B2 | 8/2007 | Catha et al. |
| 7,267,739 | B2 | 9/2007 | Blackmore et al. |
| 7,523,764 | B2 | 4/2009 | Lepola et al. |
| 7,523,765 | B2 | 4/2009 | Quigley et al. |
| 7,789,643 | B2 | 9/2010 | Lepola et al. |
| 2006/0130923 | A1 | 6/2006 | Lepola et al. |
| 2006/0174959 | A1 | 8/2006 | Bateman et al. |
| 2008/0178955 | A1 | 7/2008 | Bryant et al. |
| 2008/0213047 | A1 | 9/2008 | Bryant et al. |
| 2009/0038702 | A1 | 2/2009 | Fyfe et al. |
| 2009/0080980 | A1 | 3/2009 | Cohen |
| 2009/0129869 | A1 * | 5/2009 | Zivanovic et al. ......... 405/184.2 |
| 2009/0134554 | A1 | 5/2009 | Goss |
| 2009/0272452 | A1 | 11/2009 | Cain et al. |

* cited by examiner

SYSTEM FOR REPAIRING AND STRENGTHENING PIPE WITH INTERNAL HELICALLY WOUND TENSILE REINFORCEMENT

CROSS-REFERENCE TO RELATED APPLICATION

This application is based upon and claims priority from co-pending U.S. Provisional Patent Application Ser. No. 61/395,392 entitled "Novel means of replacing and strengthening pipe with internally wound wire reinforcement and pressure applied concrete," filed with the United States Patent and Trademark Office on May 13, 2010, by the inventor herein, the specification of which is incorporated herein by reference in its entirety.

BACKGROUND OF THE PRIOR ART

1. Field of the Invention

The present invention relates to a method of in-situ strengthening of existing pipes, and more particularly to a method for strengthening pipes by installing a reinforced composite inside the pipe, comprising a helically wound tensile reinforcement material.

2. Background of the Prior Art

Buried pipe infrastructure is rapidly deteriorating throughout the world. Many pipes transmit water and waste in gravity flow conditions, while other pressurized pipes are subject to large internal hydrostatic pressures. Pipes are generally made from steel, reinforced concrete, or polymer materials, including fiber reinforced polymers. Many pressure pipes are constructed of steel and concrete and prestressed with external wire, wrapped helically around the exterior circumference of the pipe. These wires are coated with an additional layer of concrete for corrosion protection. Pipes exposed to aggressive environments deteriorate over time due to corrosion or other material processes depending upon the materials of which they are constructed. After substantial deterioration has taken place, the pipes are required to be replaced or repaired. In the case of pressure pipes, failure can result in expensive and dangerous main breaks. The reinforcing prestressed wires are subject to deterioration and breakage resulting in pipe failure. External pressure from the surrounding environment and internal pressure from the water they carry may cause the pipes to crack and leak. In order to repair the pipes, segments must typically be removed entirely requiring significant disruption to traffic and structures above the pipes, such as roads or buildings. In addition, such repairs consume significant amounts of time and resources, and can be quite costly.

There are many different in-situ methods for repairing failed or deteriorating pipes. Some methods are intended to strengthen the existing pipe, relying on some strength being contributed by the existing pipe, while others are intended to entirely replace the existing pipe. Some of such methods include placing liners inside the pipe and adhering such liners to the pipe's internal walls as shown, for example, in U.S. Pat. Nos. 3,149,646; 4,768,562; 5,308,430; 6,089,275; 6,167,913; 6,283,211; 7,025,580; 7,258,141; 7,267,739; and United States Patent Application Publication No. 2008/0178955. Other methods used for repairing such pipes place materials around the structure on the outside wall of the pipe to protect and reinforce the pipe as shown, for example, in U.S. Pat. No. 5,683,530. The currently existing methods of lining or reinforcing pipes are labor intensive and expensive.

SUMMARY OF THE INVENTION

A method for repairing a pipe is disclosed in which a tensile reinforcement material is pushed into a helical winding against the inside wall of the pipe while avoiding the creation of and/or relieving torsional stress on the tensile reinforcement material that would otherwise be created by the act of winding it around the inside wall of the pipe.

Also disclosed is a system for winding the tensile reinforcement material inside a pipe, which system includes a spool assembly from which the tensile reinforcement material is delivered to a movable cart. The cart carries an axle assembly that includes a pusher for feeding the tensile reinforcement material from the spool assembly to an installation arm and winding it around the inside wall of the pipe. The system is configured to push the tensile material into a helical winding without creating and/or while relieving torsional stress on the tensile material that would otherwise be created by the act of winding it around the inside wall of the pipe.

With regard to certain aspects of the invention, the spool assembly may be connected to and held on the movable cart. As the pusher feeds the tensile reinforcement material from the spool assembly to the installation arm and winds the tensile reinforcement material around the inside wall of the pipe, the spool assembly may be rotated in order to relieve the stress on the tensile reinforcement material as it is being wound around the inside wall of the pipe.

With regard to other aspects of the invention, the spool assembly may be mounted on a powered turntable, and the system may further comprise a turntable pusher, a continuous rotating sheath rotationally connected to the turntable at one end of the sheath, and a movable cart and installation arm positioned adjacent the opposite end of the sheath. The powered turntable may be placed outside the pipe and feed the tensile reinforcement material to the continuous rotating sheath, while turning in order to prevent the accumulation of torsional stress in the reinforcement material.

Likewise, with regard to still further aspects of the invention, the spool may be connected to and held on a movable cart within the pipe, and may be configured to only rotate about the spool's axle so as to take off tensile reinforcement material from the spool, with the axle of the spool extending parallel to the length of the pipe. As tensile reinforcement material is taken off from the spool, the reinforcement material is routed through a pusher. The pusher and installation arm are mounted on a support arm that likewise rotates about an axis that is parallel to the length of the pipe, such that as tensile reinforcement material is pushed through the installation arm, it is wound around the inside wall of the pipe. As the tensile reinforcement material is taken off of the spool and pushed through the installation arm, it remains in line with the direction in which it is pushed into successive coils against the interior wall of the pipe, thus preventing torsional stress from accumulating in the tensile reinforcement material that would otherwise be created by the act of winding it around the inside of the pipe.

In each of the above cases, the helical coil of tensile reinforcement material is embedded within a hardening matrix, which may be finished to provide a smooth interior pipe surface. Moreover, by compressing the tensile reinforcement material into the interior wall of the pipe, the bond of the hardening matrix to the substrate of the pipe is improved, as the process of compressing the tensile reinforcement material into the pipe wall forces the hardening matrix into the pores of the substrate, thus forming a strengthened composite reinforcement inside of the pipe.

BRIEF DESCRIPTION OF THE DRAWINGS

The numerous advantages of the present invention may be better understood by those skilled in the art by reference to the accompanying figures in which.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

A method for repairing a pipe is described in which a tensile reinforcement material, having sufficient stiffness to resist buckling over short distances, is compressed onto the inside surface of the pipe into a continuous helical coil of various spacing while avoiding the creation of and/or relieving torsional stress on the tensile reinforcement material that would otherwise be created by the act of winding it around the inside wall of the pipe. With regard to certain aspects of a particularly preferred embodiment, as the tensile reinforcement material is installed, it may be rotated about its longitudinal axis to relieve torsional stress created by the act of helically winding the tensile reinforcement material into the pipe. The tensile reinforcement material may likewise be both pushed against the interior surface of the pipe and taken off from the spool in a common direction that is perpendicular to the length of the pipe, thus preventing the creation of torsional stress in the tensile reinforcement material. In each case, the helical winding of tensile reinforcement material is preferably embedded in a hardening matrix, and the process of compressing the tensile reinforcement material against the interior surface of the pipe improves the bond of the hardening material to the substrate of the pipe wall by forcing the hardening matrix into the pores of that substrate, resulting in a strengthened composite reinforcement inside of the pipe.

The tensile reinforcement material may consist of a wire, rod, strand, cable or any combination of these and may be made of one or more of a variety of materials such as steel of various grades, including high-strength steel or prestressed steel, or pre-cured glass, carbon, or polyaramid fiber reinforced polymer materials and other similar materials that are sufficiently stiff to be compressed against the pipe wall into a circular configuration without buckling. The cross-section of the tensile reinforcement material may be circular, elliptical, polygonal, or irregular and the exterior of the material may be deformed or indented in order to increase the bonding surface area for binding with a binding matrix material. After placement, the reinforcement material is capable of maintaining its position and configuration against the pipe wall without being adhered or mechanically fixed to the pipe.

As mentioned above, the tensile reinforcement material is preferably embedded in a hardening matrix material that is applied to the interior surface of the pipe before the tensile reinforcement material is placed on the inside circumference of the pipe. Alternatively or in addition to applying such a hardening material before installing the tensile reinforcement material, the tensile reinforcement materially may be coated with such hardening matrix. Still further, spacers may optionally be placed between the existing interior surface of the pipe undergoing repair and the winding of tensile reinforcement material, thus creating an open space therebetween that may be filled with such hardening matrix after installation of the tensile reinforcement material. The hardening matrix material may be applied by many conventional methods as will occur to those of ordinary skill in the art, including by way of non-limiting example spray application, trowel application, etc. The tensile reinforcement material is embedded in the hardening matrix while it is still in its unhardened or uncured state, and in fact compressing the tensile reinforcement material against the interior of the pipe helps to force the hardening matrix into the pores of the substrate of the pipe, thus improving the bond of the hardening matrix. The hardening matrix material may be selected from many different bonding materials known to persons of ordinary skill in the art, such as hydraulic cements and mortars, which may be polymer modified or fiber reinforced, and polymers such as epoxies or vinyl esters that may also be fiber reinforced. After placement of the helically wound tensile reinforcement layer, a second layer of hardening matrix material may be applied over the tensile reinforcement material to completely encapsulate the tensile reinforcement material. Once the matrix is hardened or cured, the combination of the hardening matrix and tensile reinforcement material creates a structural reinforced composite liner. The matrix material may bond the tensile reinforcement material to the interior surface of the existing pipe, providing supplemental reinforcement, or it may be unbonded creating a stand-alone reinforced composite pipe within the existing pipe.

Figure 1:
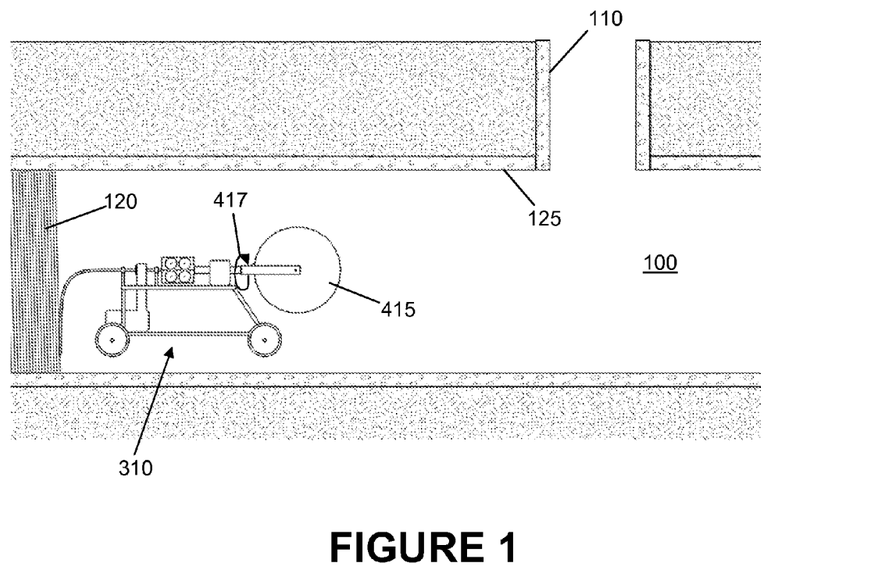
FIG. 1 illustrates a side cross sectional view of a pipe being lined with a tensile reinforcement material in accordance with certain aspects of an embodiment of the invention.

FIG. 1 shows a pipe 100 being repaired in accordance with certain aspects of an embodiment of the invention. The pipe has an access point 110 (e.g., a manhole), through which individuals and/or equipment can enter the pipe 100. In order to repair and/or strengthen the pipe 100, tensile reinforcement material 120 is introduced through the access point 110. The tensile reinforcement material 120 is attached to the inside wall 125 of the pipe 100, and an installer 310 helically winds tensile reinforcement material 120 around the inside wall 125 of the pipe 100. With regard to the system of FIG. 1, as the reinforcement material 120 is wound around the inside wall 125 of the pipe 100, a spool 415 holding and feeding the tensile reinforcement material 120 is rotated (arrow 417) in order to relieve torsional stress in the tensile reinforcement material as it is placed on the inside wall 125 of the pipe 100.

It is contemplated that spool 415 of the tensile reinforcement material 120 may be placed within the pipe 100 for repair of the pipe 100, or may alternatively be assembled within the pipe. If the spool 415 of tensile reinforcement material 120 is to be assembled within the pipe, the tensile reinforcement material may be transferred from a spool outside of the pipe onto the spool 415 inside the pipe. Alternatively, the spool 415 of the reinforcement material 120 may be left outside the pipe, in which case only lengths of reinforcement material 120 would be fed through the access point 110, as further described below. Once the reinforcement material 120 has been fed to the location within the pipe at which the reinforcement material is to be installed, the reinforcement material 120 is secured to the pipe 100. The reinforcement material 120 may be secured by drilling a hole into the pipe 100 and placing a portion of the reinforcement material 120 into the hole. A person of ordinary skill in the art will recognize that there are many other ways to secure the starting portion of the reinforcement material 120 to the pipe 100.

After the reinforcement material 120 is secured to the pipe 100, the reinforcement material is helically wound around the inside wall 125 of the pipe 100 while avoiding the creation of and/or relieving torsional stress in the reinforcement material that would otherwise be created by the act of winding it around the inside wall of the pipe. For example, reinforcement material 120 may be rotated about its longitudinal axis (such as by rotation of spool 415 in the direction of arrow 417) so as to relieve the torsional stress on the reinforcement material 120 created by the winding process. As additional reinforcement material 120 is wound against the inside wall 125 of the pipe 100, the rigidity of reinforcement material 120 is sufficient so as to cause the already-installed reinforcement material to remain in its helical winding, adjacent the interior surface of the pipe, without anchoring or adhering the tensile reinforcement material to the pipe.

Optionally, the method described above may be used to line a pipe 100 with multiple layers of tensile reinforcement material 120. In this case, the tensile reinforcement material 120 may be first coiled against the inside wall 125 of the pipe 120, while relieving the torsional stress on the tensile reinforcement material 120, and embedded within a hardening matrix, all as explained above. Thereafter, a second layer of tensile reinforcement material 120 may be formed by winding tensile reinforcement material 120 against the reinforced composite formed as above, and then embedding such second layer within a hardening matrix, thus forming multiple layers of reinforced composite.

As shown in FIG. 1, the reinforcement material 120 may be installed in pipe 100 through the use of an installer (shown generally at 310). As shown more particularly in FIGS. 2 through 4, the installer 310 has three major components, comprising a spool assembly 315, an axle assembly 320, and a movable cart 325. When the only access to the pipe is through a manhole, the installer may be assembled inside the pipe.

The spool assembly 315 feeds the tensile reinforcement material 120 to the axle assembly 320. As shown more particularly in FIGS. 2 through 4, the spool assembly 315 may include spool 415 with a spool axle 420, which removably mounts spool 415 between a pair of spool arms 410. Spool 415 may be attached to the spool assembly 315 in any manner that allows the spool 415 to turn between spool arms 410, methods for which are well known to those of ordinary skill in the art.

Figure 2:
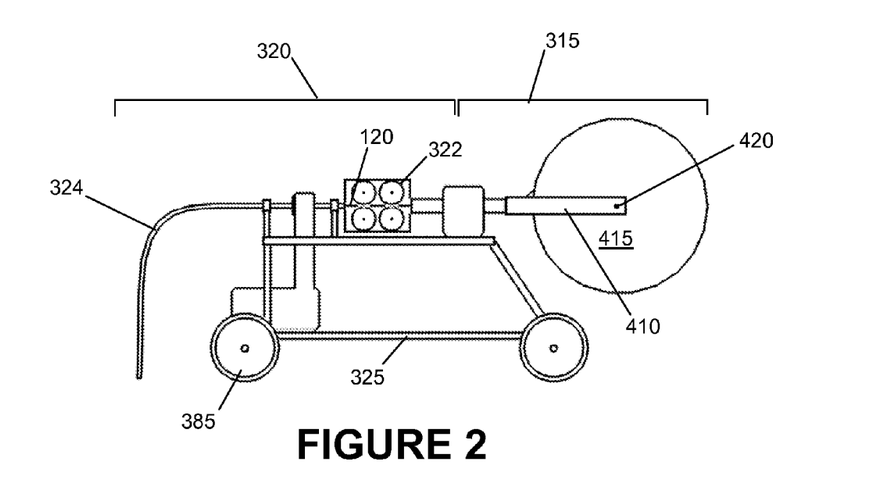
FIG. 2 illustrates a side view of one example of an installer for winding reinforcement material inside a pipe in accordance with certain aspects of an embodiment of the invention.
Figure 3:
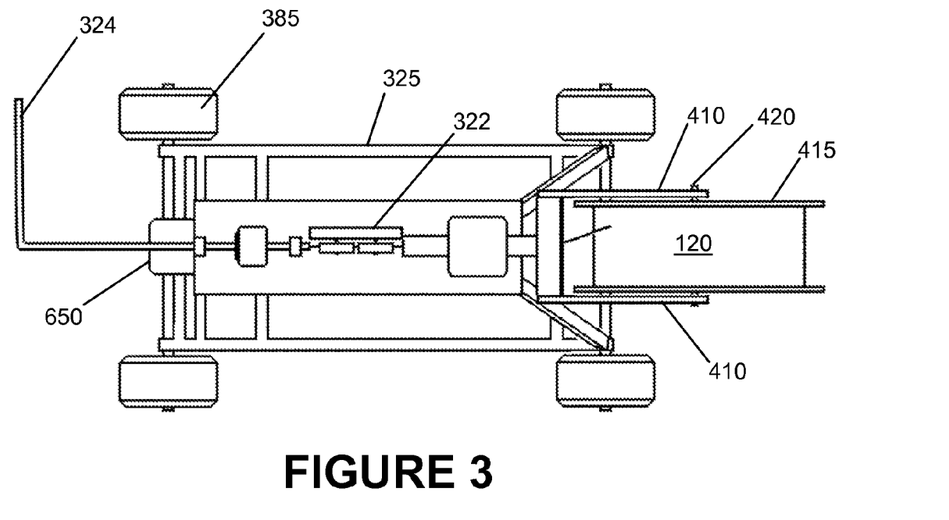
FIG. 3 illustrates a top view of the installer of FIG. 2.
Figure 4:
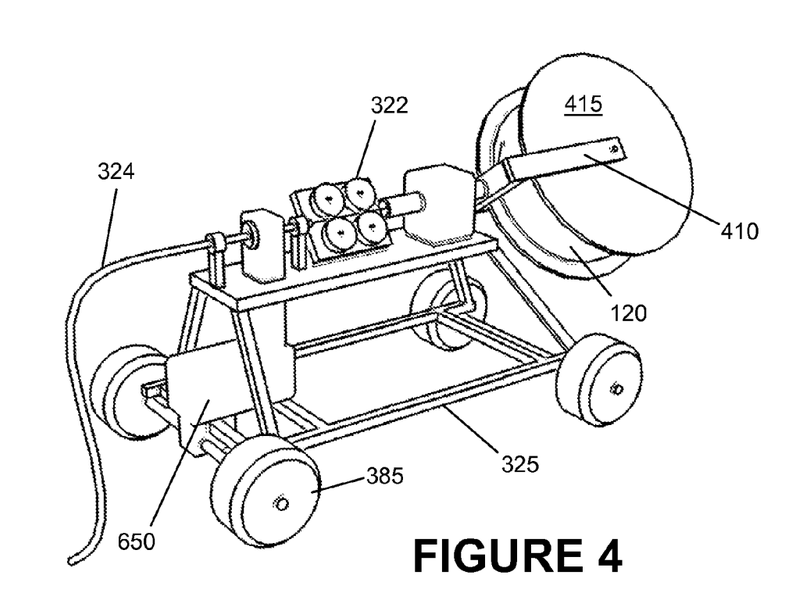
FIG. 4 illustrates a perspective view of the installer of FIG. 2.

The axle assembly 320 is carried by movable cart 325. Spool assembly 315 is attached to the axle assembly 320 at the back end of axle assembly 320. Axle assembly 320 includes a hydraulic pusher 322 of traditional configuration. Those of ordinary skill in the art will recognize that alternative pushers may likewise be used (e.g., electric, etc.) without departing from the spirit and scope of the invention. The pusher 322 feeds the tensile reinforcement material 120 from the spool 415 to an installation arm 324 positioned at the forward end of axle assembly 320. Axle assembly 320 may be mechanically connected to a drive assembly 650 on the movable cart so that rotation of the installation arm 324 may be synchronized to longitudinal movement of the moveable cart within the pipe, thus achieving a desired spacing between successive coils of the installed tensile reinforcement material 120. In this case, drive assembly 650 may be powered to drive axle assembly 320, or the reaction of the tensile reinforcement material 120 against the interior surface of the pipe may cause the installation arm 342 to rotate, in turn rotating axle assembly 320 and driving drive assembly 650 through such mechanical connection. Alternatively, an electrical controller may control the drive speed of each of the installation arm and the motor of drive assembly 650 to properly synchronize the movement of such components. As yet another alternative, the drive speed of each of installation arm 324 and drive assembly 650 may be independently controlled, so long as for a given rotational speed of installation arm 324, a user may generate a desired spacing between successive coils of the installed reinforcing material 120 based upon the drive speed of drive assembly 650. In each case, the feed rate of the tensile reinforcement material from spool 415 is preferably controlled by an electrical controller.

As shown in FIGS. 2 through 4, installation arm 324 has a generally S-shaped configuration that guides reinforcement material 120 towards the internal surface of the pipe in a direction that is generally at a right angle to the feed direction of reinforcement material 120 from spool 415 and through pusher 322. Other configurations for installation arm 324 may likewise be used without departing from the spirit and scope of the invention, as long as the installation arm 324 is configured to push the tensile reinforcement material into a continuous helical coil on the inside of the pipe.

As mentioned above, spool assembly 315 and axle assembly 320 may be mounted on a movable cart 325. Movable cart 325 also has wheels 385 and drive assembly 650. The drive assembly 650 preferably includes a motor that is configured to drive at least one of wheels 385, and may include a mechanical link to axle assembly 320 so as to provide synchronized movement between drive assembly 650 and installation arm 324.

Figure 5:
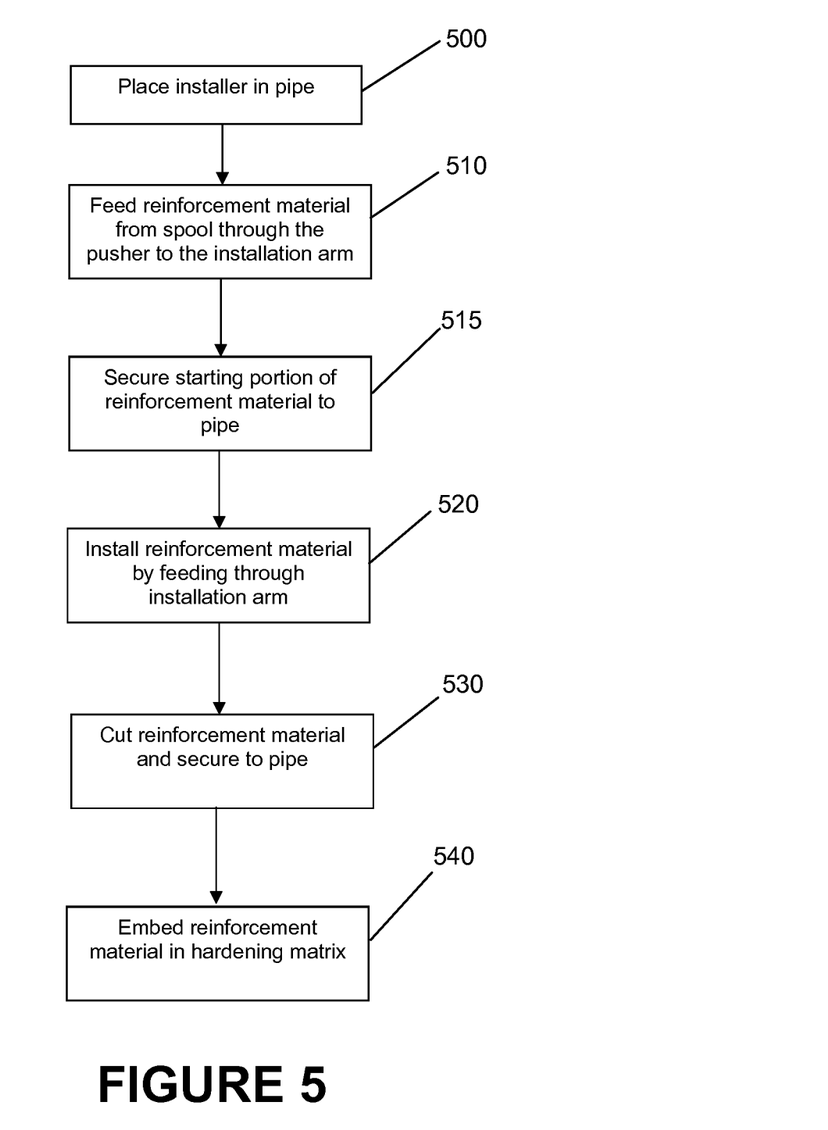
FIG. 5 illustrates an exemplary method for repairing a pipe in accordance with certain aspects of an embodiment of the invention.

A method of repairing a pipe 100 using the installer 310 described above, in accordance with one aspect of the present invention, is shown in FIG. 5. At step 500, the installer 310 is placed or assembled inside the pipe 100. At step 510, the reinforcement material 120 is fed from the spool 415 through the pusher 322 and through the installation arm 324, providing a starting portion of reinforcement material 120. Next, at step 515, the starting portion of reinforcement material 120 is secured to the inside wall 125 of the pipe 100. In some circumstances, it is contemplated that it may not be necessary to secure the starting portion of reinforcement material 120 to the inside wall 125 of the pipe 100. At step 520, the reinforcement material 120 is installed onto the inside wall 125 of the pipe 100 as spool assembly 315 is rotated about an axis that is perpendicular to the axis about which the tensile reinforcement material 120 is coiled. Such rotation of spool assembly 315 relieves the torsional stress on the reinforcement material 120 that would otherwise result from the helical placement of the reinforcement material 120 on the inside wall 125 of the pipe 100. At step 530, the reinforcement material 120 is cut from the spool 415 and the end of the reinforcement material 120 is secured to the inside wall 125 of the pipe 100. If the entire spool 415 runs out, the end of the reinforcement material 120 is secured to the inside wall 125 of the pipe 120, and may optionally be joined to reinforcement material from a new spool should further reinforcement be desired. Last, at step 540, the reinforcement material 120 is embedded within a hardening matrix material.

Figure 6:
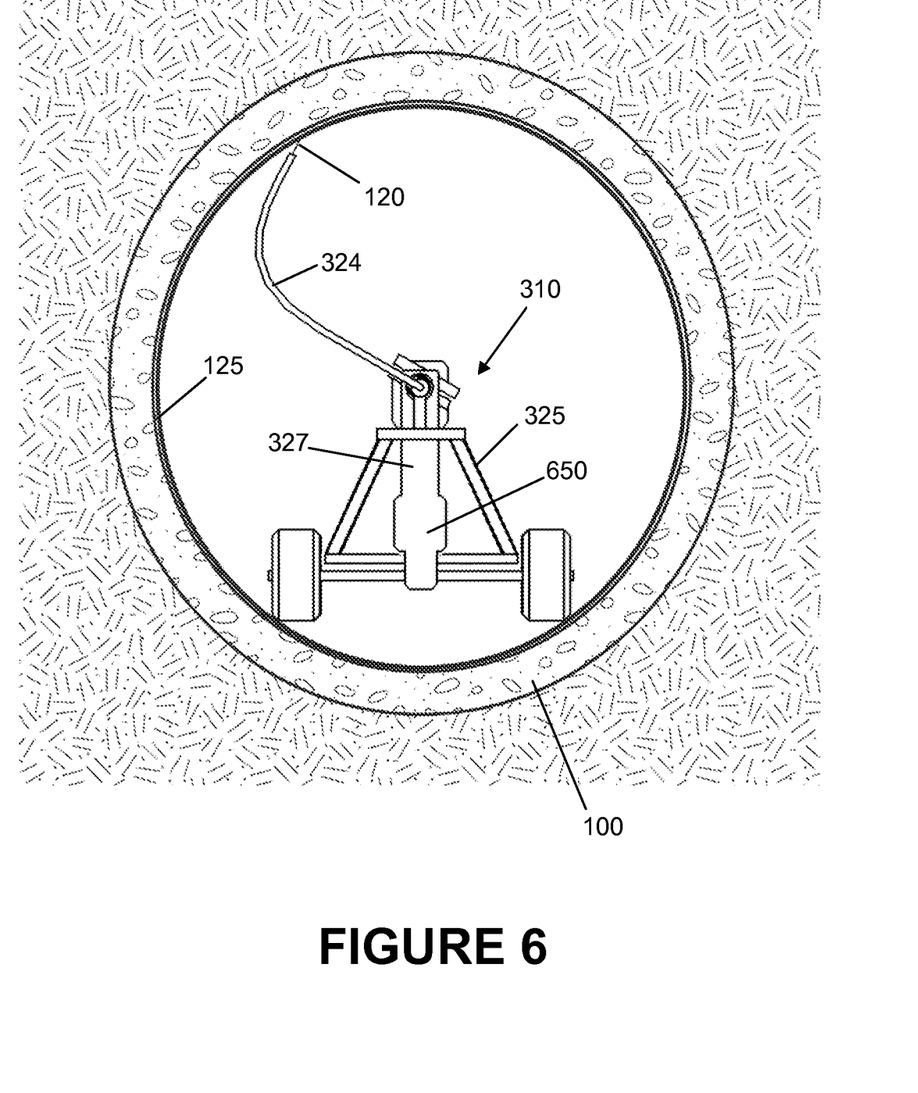
FIG. 6 illustrates a frontal cross section of a pipe being repaired in accordance with certain aspects of an embodiment of the invention.

FIG. 6 shows an installer 310, where the installation arm 324 is placing reinforcement material 120 on the inside wall 125 of the pipe 100. As shown in the figure, the installer 310 may have a mechanical linkage 327, such as a chain, that drives the installer 310, moving the installer 310 in the desired direction. Alternatively, installer 310 may be driven by an independently controlled motor in drive assembly 650.

Figure 7:
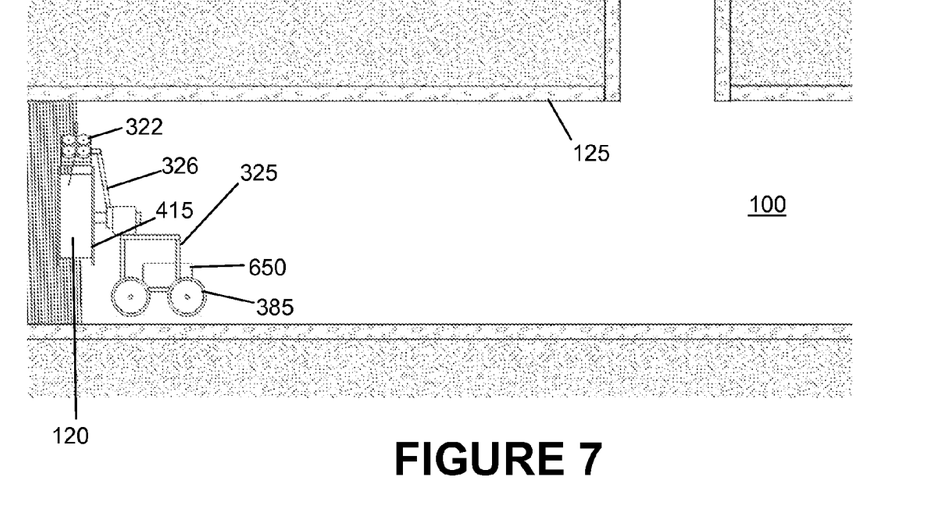
FIG. 7 illustrates a side cross sectional view of a pipe being lined with a tensile reinforcement material in accordance with certain aspects of an embodiment of the invention.
Figure 8:
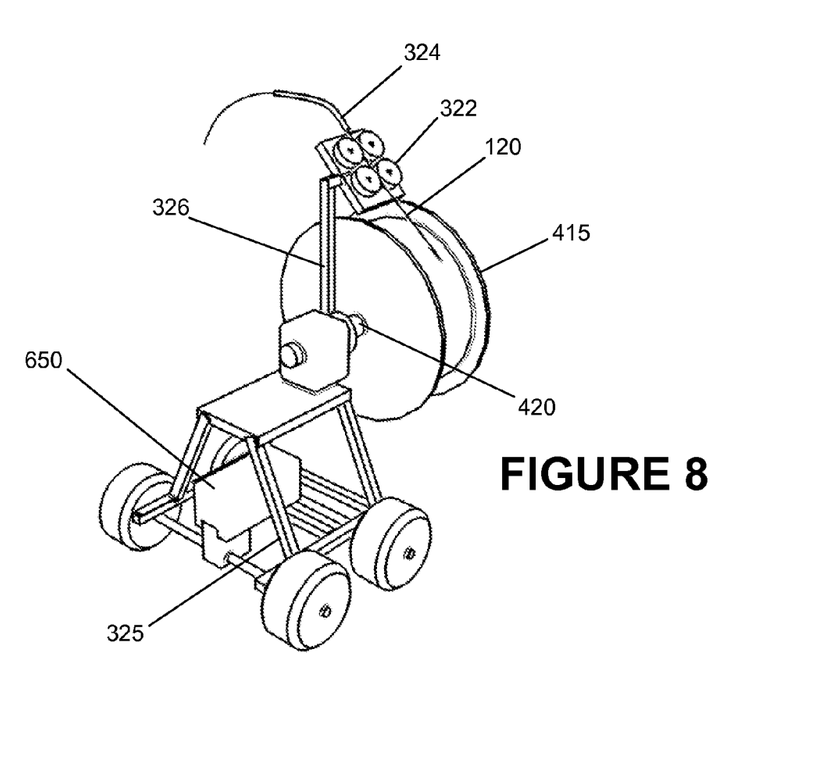
FIG. 8 illustrates a perspective view of the installer used in FIG. 7.
Figure 9:
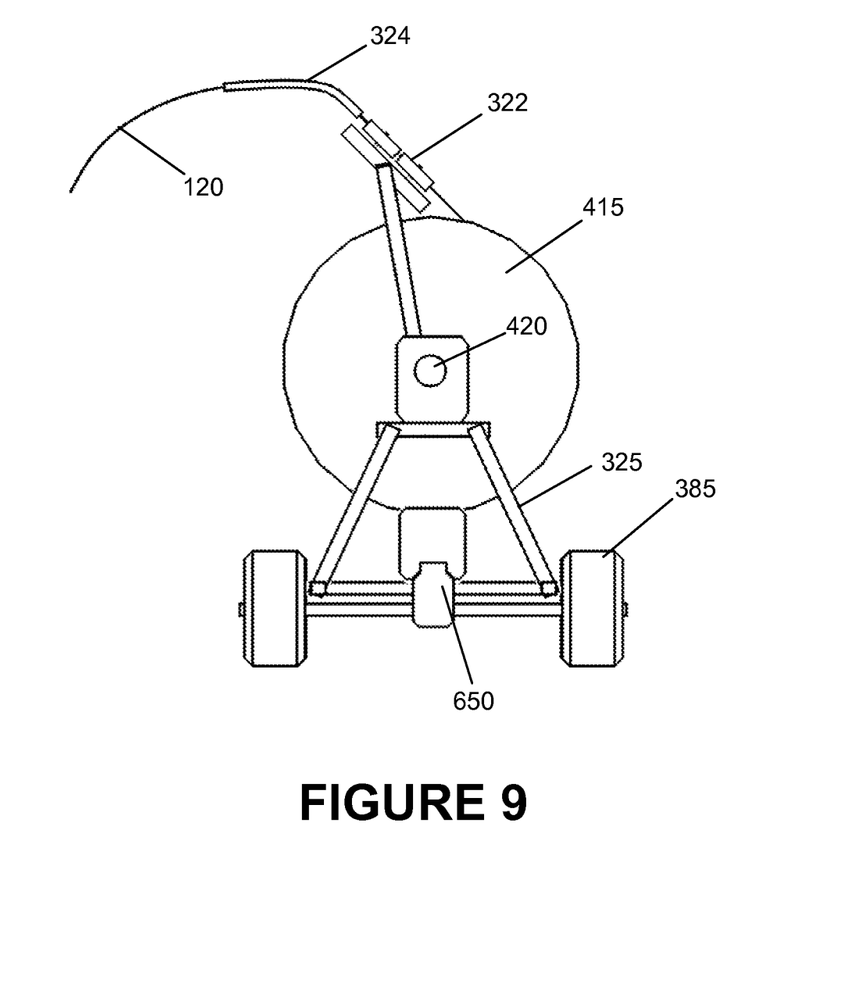
FIG. 9 illustrates a front view of the installer of FIG. 8.

Alternatively, and with reference to FIG. 7, spool 415 may be configured to rotate so as to take off tensile reinforcement material 120 from the spool 415, with the axle of the spool 415 extending parallel to the length of the pipe 100. As tensile reinforcement material 120 is taken off from the spool 415, it may be both pushed against the interior surface of the pipe and taken off from the spool 415 in a common direction that is perpendicular to the length of the pipe, thus preventing the creation of torsional stress in the tensile reinforcement material. In this configuration, and with particular reference to FIGS. 7 through 9, spool 415 is rotatably mounted to movable cart 325 and configured to rotate on its axle 420, which axle 420 is aligned with the direction of travel of movable cart 325. Pusher 322 and installation arm 324 are mounted on a support arm 326 that is likewise configured to rotate on axle 420, in a direction opposite the direction in which spool 415 is rotated. Once again, pusher 322 pushes tensile reinforcement material 120 through installation arm 324 and against the interior wall 125 of pipe 100. The reaction force caused by the tensile reinforcement material 120 being compressed onto the interior wall 125 of pipe 100 may cause arm 326 to rotate, or arm 326 may be externally driven. Likewise, arm 326 may be mechanically linked to drive assembly 650, whereby such rotation of arm 326 may cause rotation of a drive wheel 385 of movable cart 310, or the two may be commonly driven by drive assembly 650, linked through electronic controls that commonly drive arm 326 and drive wheel 385, or they may be driven independently as discussed above.

Figure 10:
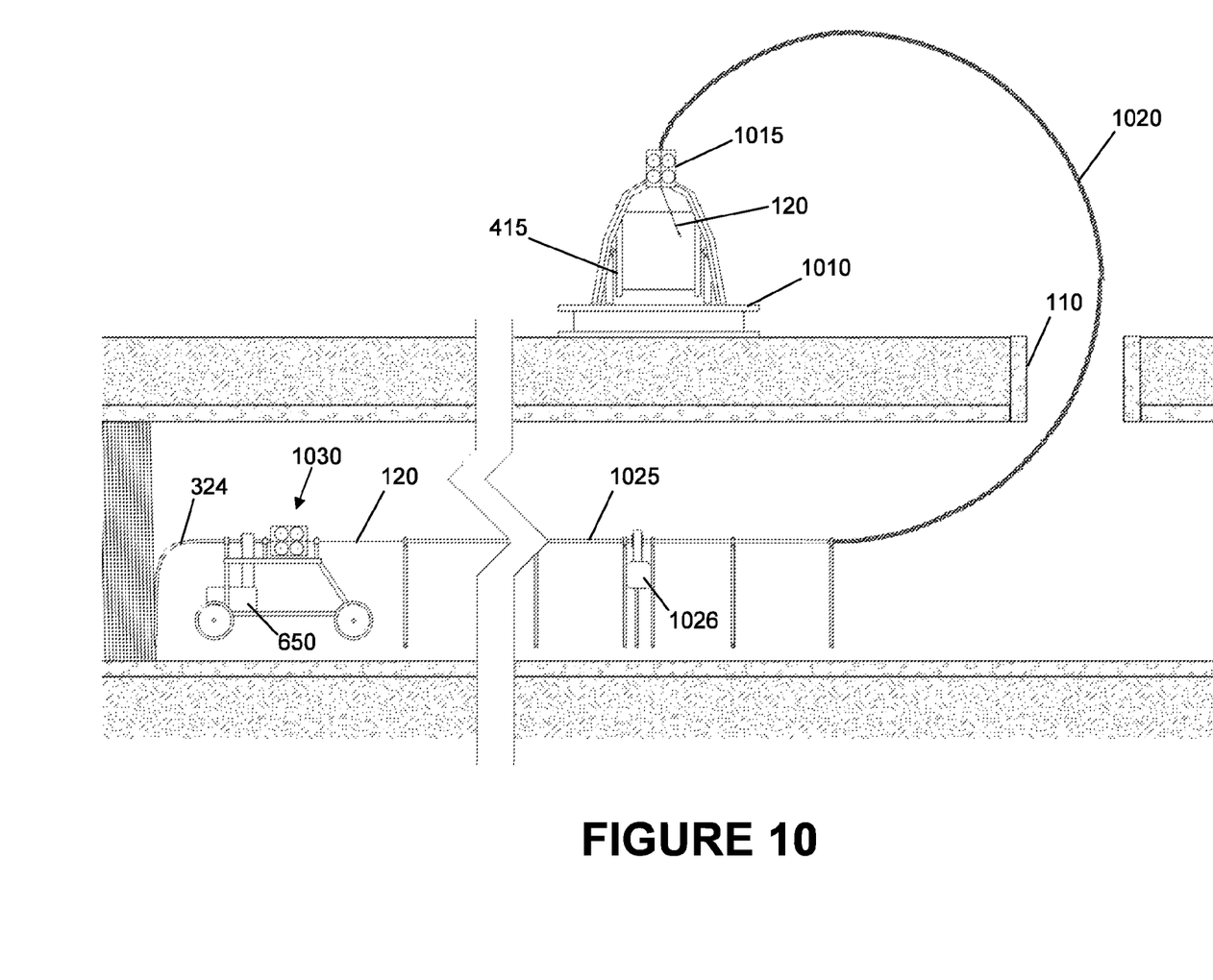
FIG. 10 illustrates a system for repairing a pipe in accordance with certain aspects of an embodiment of the invention.

As shown in FIG. 10, spool 415 may optionally be separated from the remainder of the reinforcement material depositing assembly. In this case, the system may include five major components: a powered turntable 1010, a turntable pusher 1015, a coil spring 1020, a linear rotating sheath 1025, and an installer 1030. The powered turntable 1010 is configured to turn about an axis that is perpendicular to the axis about which the reinforcement material 120 is coiled, thus again preventing torsional stress from building in reinforcement material 120 as it is helically wound around the interior of pipe 100. The powered turntable 1010 is preferably attached to a fixed base. The spool 415 feeds tensile reinforcement material 120 to the turntable pusher 1015, which also turns about the turntable's rotational axis. The powered turntable 1010 may be rotationally connected to the continuous rotating sheath 1025 through coil spring 1020, such that each of the elements rotate in the same direction and speed to prevent torsional stress from accumulating in reinforcement material 120.

The reinforcement material 120 is pushed into the pipe 100 through the access point 110, and preferably through a coil spring 1020, which aids in guiding the tensile reinforcement material 120 to continuous rotating sheath 1025. The coil spring 1020 is mechanically connected to the turntable pusher and the rotating sheath. In one example, the continuous rotating sheath 1025 comprises a tube 1060 that turns as turntable 1058 turns. The tube 1060 is mounted on bearings 1065 that may be temporarily attached to the inside wall 125 of the pipe 100 or supported on stands positioned within pipe 100. The reinforcement material 120 then enters an installer 1030, which deposits the reinforcement material 120 on the inside wall 120 of the pipe 100. Installer 1030 preferably comprises the installer 310 described above without the spool assembly 315. As the tensile reinforcement material 120 is pushed through the installation arm 324, the reaction of the tensile reinforcement material pushing against the interior surface of the pipe causes the installation arm 324 to rotate at the same rate as the advancement of the tensile reinforcement material 120. The spacing of the tensile reinforcement material is controlled by the rate of longitudinal movement of the installer 1030. The longitudinal movement of the installer 1030 may be controlled by the drive assembly, which may be independently controlled by an electrical controller or may be mechanically driven through a mechanical linkage with installation arm 324, or the installer 1030 may be pulled by a winch.

As shown in FIG. 10, the reinforcement material 120 is pushed from the turntable pusher 1015 to the closest end of the tube of the continuous rotating sheath 1025. Alternatively, a flexible tube or coil spring 1020 through which the tensile reinforcement material 120 is transported connects the turntable pusher 1050 and the tube of continuous rotating sheath 1025. In this case, the flexible tube also turns in the same direction that rotating sheath 1020 turns to release torsional stress in reinforcement material 120. As a further alternative, in addition to or in place of such interconnection between turntable pusher 1050 and rotating sheath 1025, an additional drive mechanism 1026 may be provided to turn, or assist in turning, rotating sheath 1025. Likewise, additional pushers of like configuration to pushers 322 and 1015 may be provided anywhere along the length of tensile reinforcement material 120 as it is directed through pipe 100.

In order to ensure synchronization between the rotation of depositing arm 324 and turntable 1010, a configurable electrical control is preferably provided, and may be configured so as to control the speed of each drive system (including drive 650 on movable cart 325, turntable 1010, and any intermediate drives 1026), and optionally each pusher and longitudinal movement of movable cart 325 within pipe 100. Alternatively, longitudinal movement of movable cart 325 may be caused as a result of the reaction force from compressing tensile reinforcement material 120 against the interior of pipe 100, through a mechanical linkage between drive wheel 385 on movable cart 325 and installing arm 324, all as detailed above.

The system shown in FIG. 10 provides several advantages over existing systems. For example, the reinforcement material 120 may be maintained above ground, and may be installed directly from a coil onto the interior surface of the pipe, without the intermediate step of transferring the material to a spool inside the pipe. The access for the reinforcement material 120 into the pipe 100 requires very small openings not much greater than the diameter of the tubing through which the reinforcement material 120 is fed to the installer 1030. Each part of the system 1000 is designed to be broken down and transported to the needed locations through standard manhole openings, reducing or eliminating any need to excavate or disturb existing structures, ground, or roads. The tensile reinforcement material 120 can be delivered and installed in the pipe over short distances or very long distances from the source of tensile reinforcement material 120. The method may be used to strengthen individual sections of pipe, or continuous lengths of pipe.

Because there is minimal torsional stress on the reinforcement material 120 and it is adequately stiff to maintain its position once it is placed on the inside wall 125 of the pipe, the process can stop at any time while maintaining structural integrity of the coiled reinforcement material 120. Placement of reinforcement material 120 can be stopped easily at end of work shifts or when the spool 415 of reinforcement material 120 needs to be replenished. Joining of reinforcement material 120 between coils or spools may be accomplished by fusing, gluing, welding, crimping, lapping, brazing, or any other method recognized by a person with ordinary skill in the art.

Reinforcement material 120 may be treated with protective systems to enhance durability. For example, steel reinforcement material 120 may be coated with zinc, organic or inorganic coatings, or ceramic treatments. The steel reinforcement material 120 may also be of a metallurgy that is resistant to corrosion, such as stainless steel or other nickel alloys. In certain applications a passive or active cathodic protection system may be installed to protect steel reinforcement material 120. If cement based materials are used as the encapsulating matrix, corrosion inhibitors, or densifying admixtures can be added to protect the steel reinforcement material 120 from corrosion. A person of ordinary skill in the art would recognize that reinforcement material 120 may be subject to a variety of environmental factors and, thus, appropriate protection from the environment may be required. Such protection is well recognized in the art.

As mentioned above, tensile reinforcement material 120 is preferably embedded in a bonding matrix material as it is installed on the inside wall 125 of the pipe 100. The bonding matrix is preferably placed on the inside wall 125 of the pipe 100 prior to placement of the tensile reinforcement material 120. The bonding matrix may be spray applied, troweled on or applied by any other means. The reinforcement material 120 is then installed, as described above, on the uncured and unhardened matrix. Advantageously, by compressing the tensile reinforcement material into the interior wall of pipe 100, the bond of the hardening matrix to the substrate of the pipe is improved, as the process of compressing the tensile reinforcement material into the pipe wall forces the hardening matrix into the pores of the substrate, thus forming a strengthened composite reinforcement inside the pipe. After the matrix hardens, the tensile reinforcement material may thus be bonded and monolithic with the existing pipe. An additional layer of matrix may then be applied over the coiled tensile reinforcement material 120, providing a protective coating over the tensile reinforcement material and resulting in a smooth finish on the inside surface of the pipe 100. The thickness of each layer of matrix may vary depending on the requirements of use of the pipe. In pipes designed to carry liquids under pressure, the matrix preferably forms a watertight surface to prevent any liquid carried by the pipe 100 from reaching the existing pipe being strengthened. The internal pressure inside the pipe 100, mostly pressurized water, is contained in the pipe 100 by the membrane or matrix layer of material, which distributes the forces of the fluid pressure to the new inner layer of the pipe 100 created by the circumferentially wrapped reinforcement material 120. In some embodiments, a supplemental waterproof coating is applied over the matrix material.

Figure 11:
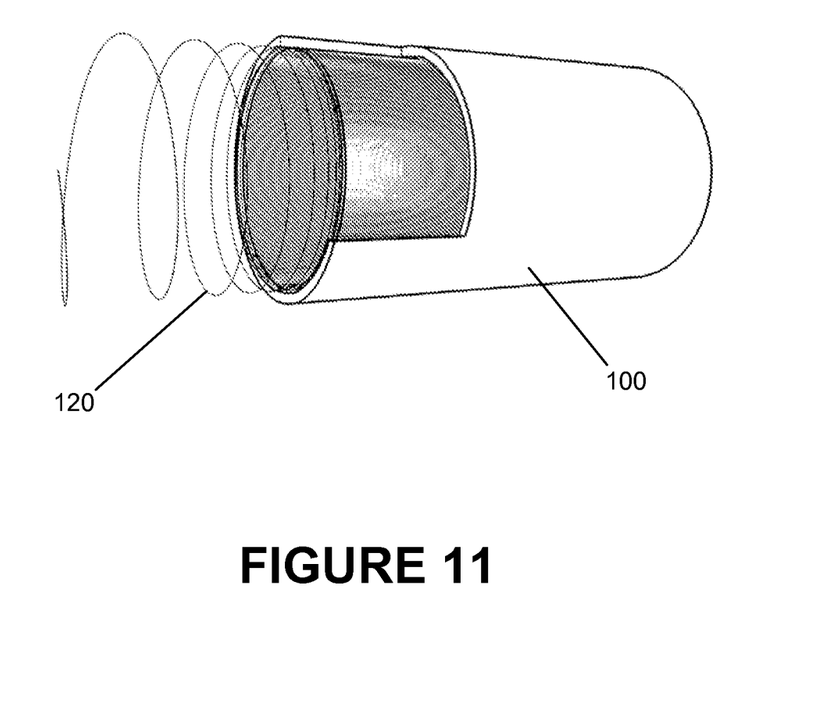
FIG. 11 is an exploded view of a pipe that is reinforced in accordance with certain aspects of an embodiment of the invention.
Figure 12:
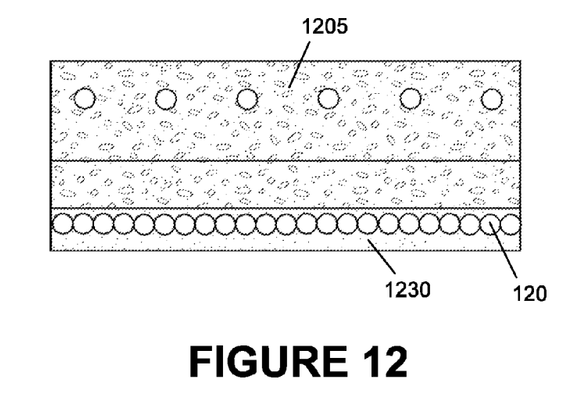
FIG. 12 illustrates a cross sectional view of a pipe that has been lined with a tensile reinforcement material and a liner in accordance with certain aspects of an embodiment of the invention.
Figure 13:
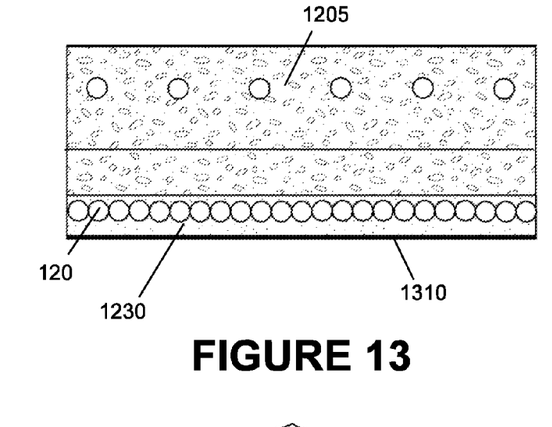
FIG. 13 illustrates a cross sectional view of the pipe of FIG. 12 with a waterproof membrane.
Figure 14:
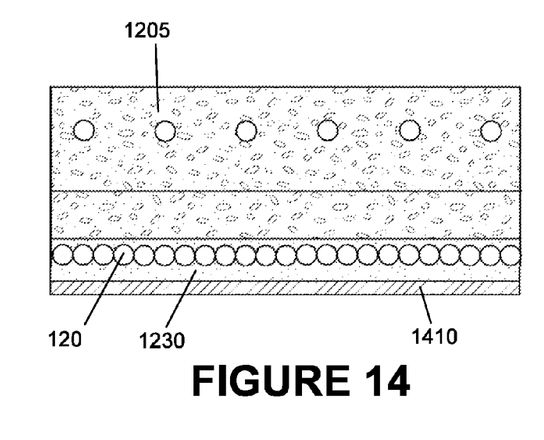
FIG. 14 illustrates a cross sectional view of the pipe of FIG. 12 with a longitudinal reinforcement layer.
Figure 15:
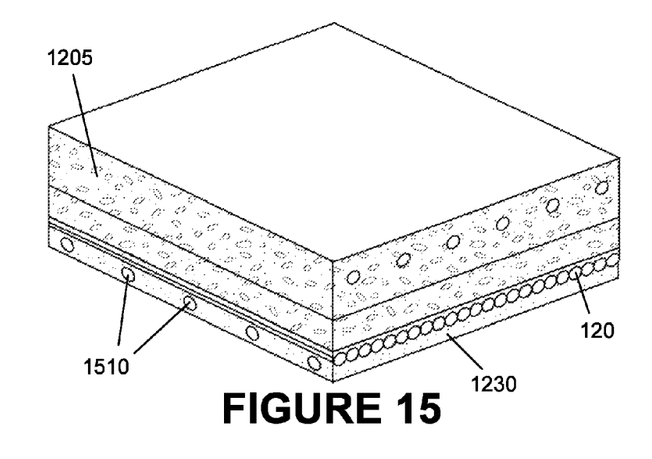
FIG. 15 illustrates a cross sectional view of the pipe of FIG. 12 with further longitudinal support.

As shown in the exploded view of FIG. 11, once the reinforcement material 120 is installed, the pipe 100 maintains a reinforced condition. As shown in the cross-sectional view of FIG. 12, such reinforced pipe 100 comprises prior pipe wall 1205, with reinforcement material 120 situated within a hardening matrix 1230 on an interior side of pipe 100. As shown in FIG. 13, such reinforced pipe 100 may optionally also include a waterproof membrane 1310 situated on the inside of the hardening matrix 1230. Still further, and as shown in FIG. 14, a further longitudinal reinforcement layer 1410 may be provided, which may comprise a fiber reinforced plastic layer, a fiber reinforced mortar layer with or without a mesh, a cured in place pipe (CIPP) layer, a steel wire mesh layer, or the like, so as to provide further longitudinal support to the original pipe structure. Likewise, and as shown in FIG. 15, further longitudinal structural support 1510 may be provided by using additional, longitudinal spans of tensile reinforcement material that may be attached to the helical windings that extend circumferentially around the interior of the pipe, which longitudinal spans of tensile reinforcement material are likewise embedded within the hardening matrix 1230.

A person of ordinary skill in the art would recognize the various advantages of the system and method described herein. The method can be utilized effectively for both small repairs of short segments of pipe 100 or for long runs. Continuous reinforcement material can be installed inside the pipe 100 through existing access openings without having to excavate entire sections of pipe. The efficient mechanical process of installation of the reinforcement material requires much less labor than existing methods. When the materials used are NSF approved, the repairs are safe for potable water applications.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. For example, while the foregoing exemplary embodiment is described as being applied to concrete pipe repair, it may likewise be used for reinforcement and/or repair of steel pipes or pipes of other configurations and materials without departing from the spirit and scope of the invention. It should be understood, therefore, that the invention may be practiced otherwise than as specifically set forth herein.

What is claimed is:
1. A system for reinforcing pipe structures comprising:
a spool assembly comprising a rotatably mounted spool;
a continuous length of tensile reinforcement material wound on and extending from said spool, and being deployable from said spool upon rotation of said spool about a central axis of said spool;

said spool assembly being rotatably mounted so as to rotate said spool assembly about an axis that is perpendicular to said central axis of said spool; and a pusher receiving said tensile reinforcement material and configured to push said tensile reinforcement material against an interior surface of a pipe structure and into a helical winding adjacent said interior surface of said pipe;

wherein said system is configured to rotate said tensile reinforcement material about a central axis extending through said tensile reinforcement material, and in a direction that relieves the torsional stress that is created by the act of helically winding said reinforcement material.

2. The system of claim 1, wherein said reinforcement material is sufficiently rigid so as to resist buckling when advanced by the pusher and pushed against the interior surface of the pipe.

3. The system of claim 2, wherein said reinforcement material is further sufficiently rigid so as to remain in said helical winding, adjacent said interior surface of said pipe without anchoring or adhering said tensile reinforcement material to said pipe.

4. The system of claim 1, further comprising:
a moveable cart mounting said pusher; and
an installation arm attached to said pusher and configured to direct said tensile reinforcement material against said interior surface of said pipe from said pusher and into said continuous helical winding.

5. The system of claim 4, wherein said system is further configured to rotate said pusher and said installation arm in unison with said spool assembly as said reinforcement material is pushed into said helical winding.

6. The system of claim 5, wherein the installation arm, pusher and spool are caused to rotate simultaneously by the force of reaction of said tensile reinforcement material compressing against said pipe interior.

7. The system of claim 5, wherein said spool is rotatably mounted to said movable cart at an end of said frame opposite said installation arm.

8. The system of claim 5, further comprising:
a spool mount rotatably mounted to said cart at an end of said cart opposite said installation arm, wherein said spool is removably and rotatably mounted within said spool mount.

9. The system of claim 5, further comprising:
a turntable configured to rotate about a generally vertical axis; and
a spool mount fixedly mounted to said turntable, wherein said spool is removably and rotatably mounted within said spool mount.

10. The system of claim 5, further comprising:
a drive unit mounted to said cart and configured to move said frame within said pipe.

11. The system of claim 10, further comprising:
a mechanical link between said drive unit and said pusher, wherein said mechanical link is configured to synchronize longitudinal movement of said frame within said pipe with rotational movement of said installation arm about a circumference of said pipe.

12. The system of claim 10, wherein the drive unit operates independently of the rotation of said installation arm.

13. The system of claim 1, further comprising a continuous rotating sheath inside which said tensile reinforcement material advances.

14. The system of claim 13, wherein said continuous rotating sheath is comprised of a coil spring.

15. The system of claim 13, wherein said continuous rotating sheath is comprised of a pipe.

16. The system of claim 13, wherein rotation of said spool assembly, said pusher, and said continuous rotating sheath are synchronized with one another.

17. The system of claim 16, further comprising:
an installation arm attached to said pusher and configured to direct said tensile reinforcement material against said interior surface of said pipe from said pusher and into said continuous helical winding; and
electronic controls configured to synchronize rotation of said installation arm and said spool assembly.

18. The system of claim 16, further comprising:
a moveable cart mounting said pusher; and
electronic controls configured to synchronize longitudinal movement of said movable cart and rotation of said spool assembly.

19. The system of claim 16, further comprising:
intermediate motors to assist the rotation of said continuous rotating sheath.

* * * * *